(12) United States Patent
Atkinson

(10) Patent No.: US 10,069,717 B2
(45) Date of Patent: Sep. 4, 2018

(54) MUTUALLY COMPATIBLE PATH SEARCH

(71) Applicant: Gary W. Atkinson, Freehold, NJ (US)

(72) Inventor: Gary W. Atkinson, Freehold, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 284 days.

(21) Appl. No.: 15/013,754

(22) Filed: Feb. 2, 2016

(65) Prior Publication Data

US 2017/0222912 A1    Aug. 3, 2017

(51) Int. Cl.
| | |
|---|---|
| *H04L 12/751* | (2013.01) |
| *H04L 12/735* | (2013.01) |
| *H04L 12/721* | (2013.01) |
| *H04L 12/729* | (2013.01) |

(52) U.S. Cl.
CPC .............. *H04L 45/02* (2013.01); *H04L 45/12* (2013.01); *H04L 45/128* (2013.01); *H04L 45/125* (2013.01)

(58) Field of Classification Search
CPC ....... H04L 45/12; H04L 45/02; H04L 45/125; H04L 45/128; H04L 45/48; H04L 45/00; H04L 45/122; H04L 45/123
USPC ......................................................... 370/248
See application file for complete search history.

(56) References Cited

U.S. PATENT DOCUMENTS

| | | | | |
|---|---|---|---|---|
| 7,308,198 B1 * | 12/2007 | Chudak | .................... | H04L 45/02 398/58 |
| 2001/0017845 A1 * | 8/2001 | Bauer | ..................... | H04L 45/04 370/238 |
| 2003/0227877 A1 * | 12/2003 | Kar | ......................... | H04L 45/08 370/252 |
| 2004/0042473 A1 * | 3/2004 | Park | ........................ | H04L 45/00 370/408 |
| 2005/0237950 A1 * | 10/2005 | Yuan | .................... | H04J 14/0227 370/255 |

(Continued)

FOREIGN PATENT DOCUMENTS

WO    WO 2009/128927    10/2009

OTHER PUBLICATIONS

International Search Report and Written Opinion of corresponding PCT Application No. PCT/US2017/014726, dated Mar. 24, 2017, 12 pages.

*Primary Examiner* — Michael Thier
*Assistant Examiner* — Rownak Islam
(74) *Attorney, Agent, or Firm* — Tong, Rea, Bentley & Kim LLC

(57) ABSTRACT

This disclosure generally discloses a path search mechanism for determining mutually compatible paths within a network includes nodes and links. The path search mechanism for determining mutually compatible paths may be configured to determine a set of mutually compatible paths for a set of demands where the demands may include requests for paths between pairs of nodes of the network. The path search mechanism for determining mutually compatible paths may be configured to determine a set of mutually compatible paths for a set of demands where compatibility may be based on edge disjointness, node disjointness, or the like, as well as various combinations thereof. The path search mechanism for determining mutually compatible paths may be configured to determine a set of mutually compatible paths for a set of demands subject to an objective.

24 Claims, 9 Drawing Sheets

(56) References Cited

U.S. PATENT DOCUMENTS

2006/0164976 A1 7/2006 Grover et al.
2014/0086065 A1* 3/2014 DeCusatis ........... H04L 41/0896
370/242

* cited by examiner

FIG. 6

PSEUDOCODE
600

DEMAND-ORDER INDEPENDENT

Let:
- $G \triangleq (V, E)$, a (undirected) graph with vertex set $V$ and edge set $E$
- $c: E \mapsto R^+$, a mapping of costs for each edge
- $D \triangleq \{d_1, ..., d_k\}$, a set of $k$ demands between vertex pairs $d_i \triangleq (s_i, t_i) \in V \otimes V$, $(s_i \neq t_i)$
  $D \triangleq \{(s_n, t_n)\}_{n \in \{1, ..., k\}} \subseteq V \otimes V$, set of $k$ demands between vertex pairs; $d_n \triangleq (s_n, t_n), (s_n \neq t_n)$
- $\mathcal{P}_n \triangleq$ set of (all) simple $s_n$-$t_n$ paths in $G$ for demand $d_n \in D$ // Demand-order independent: original graph $G$ used to create all path sets $\mathcal{P}_n$ MAIN $(G \triangleq (V, E), D)$:
- Initialize: $n \leftarrow 1$, $G_1 \leftarrow G$, $\Pi \leftarrow \emptyset$, $\Sigma \leftarrow \emptyset$, $\text{cost}(\Sigma) \leftarrow \infty$  // $\Pi \triangleq$ current soln, $\Sigma \triangleq$ best soln
- $pathSetFound = \text{SEARCH}(n, G_n, \Pi, \Sigma)$
- If $\Sigma \neq \emptyset$: $\Sigma$ is an optimal solution. Else: $\nexists$ feasible solution. STOP.

SEARCH $(n, G_n, \Pi, \Sigma)$:
- $pathSetFound \leftarrow$ false
- If $n \leq |D|$:
    SELECT $n^{th}$ demand $d_n$ from $D$         // disjointness is commutative
    CREATE path subset $\mathcal{P}_n$ in $G_n$    // original graph used when $n = 1$
    For each path $p_n \in \mathcal{P}_n$:
        If not $\text{FEASIBLE}(p_n, \Pi)$ or $\text{cost}(\Pi) \geq \text{cost}(\Sigma)$: repeat.   // cut or bound
        $\Pi \leftarrow \Pi \cup \{p_n\}$
        $G_{n+1} \leftarrow G_n$                    // $G_{n+1} = G$, no demand reordering
        $pathSetFound = \text{SEARCH}(n+1, G_{n+1}, \Pi, \Sigma)$
        If $pathSetFound =$ true: return $pathSetFound$.  // $pathSetFound$ never true
        $\Pi \leftarrow \Pi - \{p_n\}$ and then repeat.
    return $pathSetFound$
- If $n > |D|$: If $\text{cost}(\Pi) < \text{cost}(\Sigma)$: $\Sigma \leftarrow \Pi$. return $pathSetFound$

FIG. 7

PSEUDOCODE 700

DEMAND-ORDER DEPENDENT

Let:
- $G \triangleq (V, E)$, a (undirected) graph with vertex set $V$ and edge set $E$
- $c: E \mapsto R^+$, a mapping of costs for each edge
- $D \triangleq \{d_1, ..., d_k\}$, a set of $k$ demands between vertex pairs $d_i \triangleq (s_i, t_i) \in V \otimes V$, $(s_i \neq t_i)$
  $D \triangleq \{(s_n, t_n)\}_{n \in \{1, ..., k\}} \subseteq V \otimes V$, set of $k$ demands between vertex pairs; $d_n \triangleq (s_n, t_n), (s_n \neq t_n)$
- $\mathcal{P}_n \triangleq$ set of (all) simple $s_n$-$t_n$ paths in $G$ for demand $d_n \in D$ // Demand-order dependent: includes demand selection loop and ordering in SEARCH.
Pass current $D$ MAIN $(G \triangleq (V, E), D)$:
// $\Pi \triangleq$ current soln, $\Sigma \triangleq$ best soln
- Initialize: $n \leftarrow 1$, $G_1 \leftarrow G$, $D_1 \leftarrow D$, $\Pi \leftarrow \varnothing$, $\Sigma \leftarrow \varnothing$, $\text{cost}(\Sigma) \leftarrow \infty$
- $pathSetFound = \text{SEARCH}(n, G_n, D_n, \Pi, \Sigma)$
- If $\Sigma \neq \varnothing$: $\Sigma$ is an optimal solution. Else: $\nexists$ feasible solution. STOP.

SEARCH $(n, G_n, D_n, \Pi, \Sigma)$:
//$\mathcal{P}_n \triangleq$ set of simple $s_n$-$t_n$ paths in $G_n$ for demand $d_n \in D$
- $pathSetFound \leftarrow$ false
- If $n \leq |D|$:
  For each demand $d_n$ in $D_n$
     $D_{n+1} \leftarrow D_n - \{d_n\}$                  // remove selected demand
     CREATE path subset $\mathcal{P}_n$ in $G_n$ for $d_n$       // original graph used when $n=1$
     For each path $p_n \in \mathcal{P}_n$:
        If not FEASIBLE $p_n, \Pi$) or $\text{cost}(\Pi) \geq \text{cost}(\Sigma)$: repeat.    // cut or bound
        $\Pi \leftarrow \Pi \cup \{p_n\}$
        $G_{n+1} \leftarrow$ MODIFY graph $G_n$ based on $\Pi$       // $G_{n+1} = G_n$: dmd order
        $pathSetFound = \text{SEARCH}(n+1, G_{n+1}, D_{n+1}, \Pi, \Sigma)$
        If $pathSetFound=$ true: return $pathSetFound$.  // $pathSetFound$ never true
        // Could add test here (e.g., max solutions) to set $pathSetFound = $ true
        $\Pi \leftarrow \Pi - \{p_n\}$ and then repeat.
     $D_{n+1} \leftarrow D_n \cup \{d_n\}$ and then repeat.
  return $pathSetFound$
- If $n > |D|$: If $\text{cost}(\Pi) < \text{cost}(\Sigma)$: $\Sigma \leftarrow \Pi$. return $pathSetFound$.

MUTUALLY COMPATIBLE PATH SEARCH

TECHNICAL FIELD

The present disclosure relates to the field of path determinations and, more particularly but not exclusively, to determining mutually compatible paths in communication networks.

BACKGROUND

In many communication networks, end-to-end communication between a source device and a destination device traverses an end-to-end path that has been established from the source device to the destination device. There are various mechanisms for determining and establishing an end-to-end path from a source device to a destination device, many of which may have various disadvantages associated therewith.

SUMMARY

The present disclosure generally discloses a capability for determining a set of mutually compatible paths satisfying a set of demands.

In at least some embodiments, an apparatus includes a processor and a memory communicatively connected to the processor, wherein the processor is configured to receive network information for a network including a set of nodes and a set of links, receive demand information associated with a set of demands to be satisfied within the network where the demands are indicative of respective requests for respective paths between respective pairs of the nodes of the network, and determine, based on a traversal of a search tree constructed based on the network information and the demand information, a set of mutually compatible paths satisfying the set of demands, wherein the search tree includes, for at least one of the demands, a respective subset of paths for the respective demand identified from among a set of potential paths between the respective nodes of the demand, wherein the respective subset of paths for the demand includes two or more mutually disjoint paths between the respective nodes of the demand.

In at least some embodiments, a computer-readable storage medium stores instructions which, when executed by a processor, cause the processor to perform a method, the method including receiving network information for a network including a set of nodes and a set of links, receiving demand information associated with a set of demands to be satisfied within the network where the demands are indicative of respective requests for respective paths between respective pairs of the nodes of the network, and determining, based on a traversal of a search tree constructed based on the network information and the demand information, a set of mutually compatible paths satisfying the set of demands, wherein the search tree includes, for at least one of the demands, a respective subset of paths for the respective demand identified from among a set of potential paths between the respective nodes of the demand, wherein the respective subset of paths for the demand includes two or more mutually disjoint paths between the respective nodes of the demand.

In at least some embodiments, a method includes receiving network information for a network including a set of nodes and a set of links, receiving demand information associated with a set of demands to be satisfied within the network where the demands are indicative of respective requests for respective paths between respective pairs of the nodes of the network, and determining, based on a traversal of a search tree constructed based on the network information and the demand information, a set of mutually compatible paths satisfying the set of demands, wherein the search tree includes, for at least one of the demands, a respective subset of paths for the respective demand identified from among a set of potential paths between the respective nodes of the demand, wherein the respective subset of paths for the demand includes two or more mutually disjoint paths between the respective nodes of the demand.

In at least some embodiments, an apparatus includes a processor and a memory communicatively connected to the processor, wherein the processor is configured to receive search tree information associated with a set of demands to be satisfied within a network and determine, based on the search tree information, a set of mutually compatible paths satisfying the set of demands. The network includes a set of nodes and a set of links. The demands are indicative of respective requests for paths between respective pairs of the nodes of the network. The search tree information includes, for each of the demands in the set of demands, a respective set of paths between the respective nodes of the demand, wherein, for at least one of the demands in the set of demands, the respective set of paths includes a subset of mutually disjoint paths between the respective nodes of the demand that are identified from among a set of potential paths between the respective nodes of the demand.

In at least some embodiments, a computer-readable storage medium stores instructions which, when executed by a processor, cause the processor to perform a method, the method including receiving search tree information associated with a set of demands to be satisfied within a network and determining, based on the search tree information, a set of mutually compatible paths satisfying the set of demands. The network includes a set of nodes and a set of links. The demands are indicative of respective requests for paths between respective pairs of the nodes of the network. The search tree information includes, for each of the demands in the set of demands, a respective set of paths between the respective nodes of the demand, wherein, for at least one of the demands in the set of demands, the respective set of paths includes a subset of mutually disjoint paths between the respective nodes of the demand that are identified from among a set of potential paths between the respective nodes of the demand.

In at least some embodiments, a method includes receiving search tree information associated with a set of demands to be satisfied within a network and determining, based on the search tree information, a set of mutually compatible paths satisfying the set of demands. The network includes a set of nodes and a set of links. The demands are indicative of respective requests for paths between respective pairs of the nodes of the network. The search tree information includes, for each of the demands in the set of demands, a respective set of paths between the respective nodes of the demand, wherein, for at least one of the demands in the set of demands, the respective set of paths includes a subset of mutually disjoint paths between the respective nodes of the demand that are identified from among a set of potential paths between the respective nodes of the demand.

BRIEF DESCRIPTION OF THE DRAWINGS

The teachings herein can be readily understood by considering the following detailed description in conjunction with the accompanying drawings, in which:

FIG. 6 depicts exemplary pseudocode for a method for determining a set of mutually compatible paths for a set of demands where the demands are demand-order independent;

FIG. 7 depicts exemplary pseudocode for a method for determining a set of mutually compatible paths for a set of demands where the demands are demand-order dependent;

To facilitate understanding, identical reference numerals have been used, where possible, to designate identical elements that are common to the figures.

DETAILED DESCRIPTION

This disclosure generally discloses a path search mechanism for determining mutually compatible paths in a network. The path search mechanism for determining mutually compatible paths may be configured to determine a set of mutually compatible paths for a set of demands to be satisfied within the network. The path search mechanism for determining mutually compatible paths may be configured to determine a set of mutually compatible paths for a set of demands where compatibility may be based on edge disjointness, node disjointness, or the like, as well as various combinations thereof. The path search mechanism for determining mutually compatible paths may be configured to determine a set of mutually compatible paths for a set of demands subject to an objective (e.g., minimizing a total cost of the set of mutually compatible paths, minimizing a maximum path cost of the set of mutually compatible paths, minimizing a difference between a lowest-cost path of the set of mutually compatible paths and a highest-cost path of the set of mutually compatible paths, or the like, as well as various combinations thereof). The path search mechanism for determining mutually compatible paths may be configured to receive network information for a network including a set of nodes and a set of links, receive demand information associated with a set of demands to be satisfied within the network where the demands are indicative of respective requests for respective paths between respective node pairs, and determine, based on a traversal of a search tree constructed based on the network information and the demand information, the set of mutually compatible paths satisfying the set of demands. The search tree may be constructed such that, for at least one of the demands, the search tree includes a respective subset of paths between the terminal nodes of the respective demand where the respective subset of paths between the terminal nodes of the respective demand includes two or more mutually disjoint paths identified from among a set of potential paths between the respective nodes of the demand. The traversal of the search tree may be performed using any suitable underlying tree traversal process, which may include various modifications and enhancements for improving or even optimizing determination of the set of mutually compatible paths for the set of demands (e.g., pruning of infeasible or non-optimal branches of the search tree, truncating traversal of the search tree based on various conditions, identification of multiple solutions and selection between the multiple solutions to identify an optimal solution, or the like, as well as various combinations thereof). These and various other embodiments and potential advantages of the path search mechanism for determining mutually compatible paths may be further understood by way of reference to FIG. 1.

Figure 1:
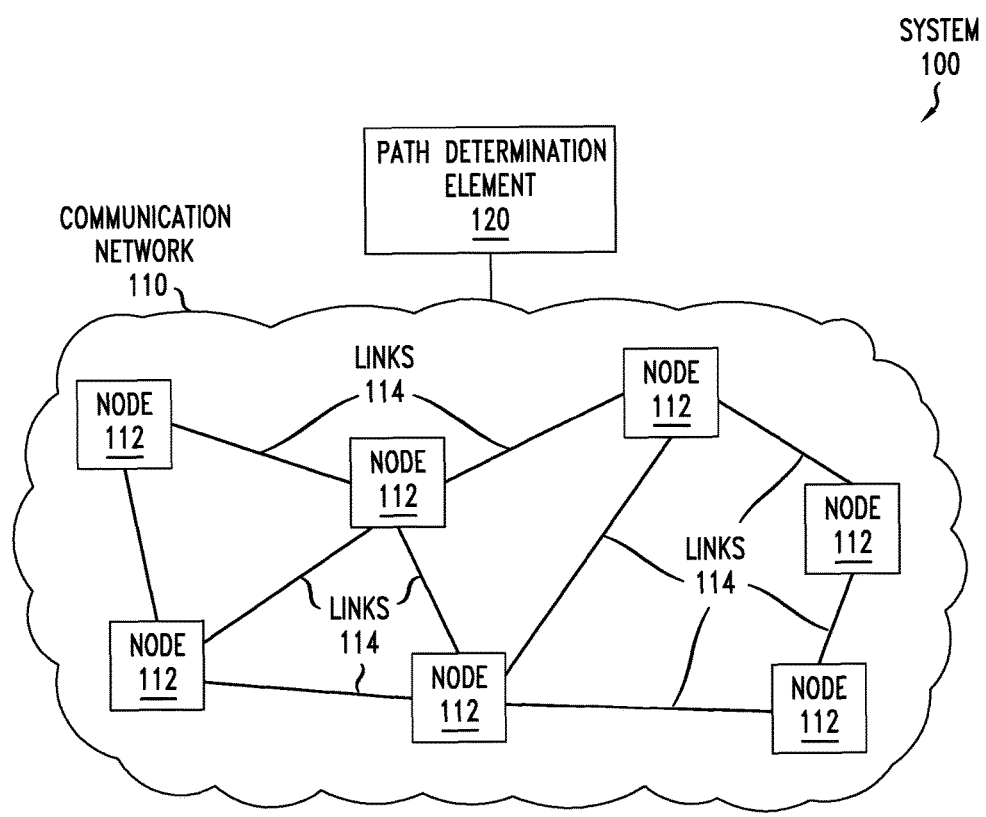
FIG. 1 depicts an exemplary system including a communication network and a path determination element configured to perform path searches for determining mutually compatible paths in the communication network.

FIG. 1 depicts an exemplary system including a communication network and a path determination element configured to perform path searches for determining mutually compatible paths in the communication network.

The system 100 includes a communication network 110 and a path determination element 120.

The communication network 110 may include any communication network which may support communications via communication paths. For example, communication network 110 may include an optical network, an Internet Protocol (IP) network, a Multiprotocol Label Switching (MPLS) network, a Software Defined Network (SDN), a wireless communication network, or the like, as well as various combinations thereof. For example, communication paths of communication network 110 may be optical paths in an optical network, IP paths in an IP network, Label Switched Paths (LSPs) in an MPLS network, wireless paths in a wireless network, or the like. The communication network 110 may be a single network (e.g., a service provider network, a datacenter network, an enterprise network, or the like) or a collection of networks (e.g., access and core networks of a service provider, multiple datacenter networks at multiple facilities of a cloud provider, multiple local enterprise networks at multiple campuses of an enterprise, or the like). The communication network 110 may be geographically concentrated or may be geographically dispersed. The communication network 110 may have various other characteristics or be arranged in various other ways.

The communication network 110 includes a set of nodes 112 and a set of links 114. The nodes 112 are interconnected via the links 114 to provide a network topology for the communication network 110. The nodes 112 and links 114 may include various types of nodes 112 and links 114 which may support communications via communication paths, which may vary across different types of communication networks. For example, in the case in which the communication network 110 is an optical network, the nodes 112 may be optical nodes (e.g., optical switches, optical add/drop multiplexers, or the like) and the links 114 may be optical links (e.g., optical fibers or the like). For example, in the case in which the communication network 110 is an IP network or an MPLS network, the nodes 112 may be switches or routers and the links 114 may include any suitable types of links which may support communication between switches and routers. The links 114 may be physical links or logical links. The nodes 112 and links 114 may include any other types of nodes and links, respectively, suitable for supporting communications within communication network 110.

The communication network 110 may include all or part of the end-to-end communication path. The communication network 110 may be used for various purposes or within various contexts. For example, communication network 110 may be a core IP/MPLS network supporting communication paths between ingress points and egress points of the core IP/MPLS network (e.g., the path via the communication network represents only a portion of the end-to-end path), an edge IP/MPLS network supporting communication between customer networks and a core IP network, a combination of edge and core IP/MPLS networks supporting communication between customer locations, an optical transport network supporting communication between customer networks, or the like, as well as various combinations thereof.

The path determination element 120 may be configured to determine (or compute) communication paths for communication network 110. The path determination element 120, for a set of demands (namely, for a set of node pairs of nodes 112), may be configured to determine a set of mutually compatible paths for the set of demands. The set of demands may include two or more demands and, similarly, the set of mutually compatible paths for the set of demands may include two or more paths, respectively. The mutual compatibility of the mutually compatible paths for the set of demands may be based on various criteria (e.g., the mutually compatible paths are mutually link-disjoint, the mutually compatible paths are mutually node-disjoint, the mutually compatible paths are mutually link-disjoint and node-disjoint, or the like). The path determination element 120, for a set of demands, may be configured to determine a set of mutually compatible paths for the set of demands based on a solution-level objective for the set of mutually compatible paths for the set of demands (e.g., at least one of minimizing a total cost of the set of mutually compatible paths, minimizing a maximum path cost of the set of mutually compatible paths, minimizing a difference between a lowest-cost path of the set of mutually compatible paths and a highest-cost path of the set of mutually compatible paths, or the like, as well as various combinations thereof). The path determination element 120, for a set of demands, may be configured to determine a set of mutually compatible paths for the set of demands that satisfies a set of constraints (e.g., a constraint based on the criteria for mutual compatibility and, optionally, one or more additional constraints). The path determination element 120, for a set of demands, may be configured to determine a set of mutually compatible paths for the set of demands using one or more mechanisms tending to control the overall computation effort expended in determining the set of mutually compatible paths for the set of demands (e.g., restricting the paths considered per demand, cost-bounding, immediate pruning of search branches (e.g., infeasible search branched, search branches associated with non-optimal solutions, or the like), limiting the maximum number of solutions found, or the like, as well as various combinations thereof). The path determination element 120, for a set of demands, may be configured to determine a set of mutually compatible paths for the set of demands based on communication network information and demand information.

The communication network information may include various types of information associated with communication network 110. The communication network information may include information which may be used to determine paths between nodes 112 of communication network 110 via links 114 of communication network 110. The communication network information may include network component information identifying the components of communication network (e.g., the nodes 112 and the links 114 of the communication network 110). The communication network information may include node information associated with nodes 112, such as one or more of node weight information indicative of node weights of the nodes 112, node capability information indicative of the capabilities of the nodes 112 (e.g., port speeds, processing capabilities, protocols supported, or the like), configuration information indicative as to the manner in which the nodes 112 are configured, operational status information of the nodes 112, or the like, as well as various combinations thereof. The communication network information may include link information associated with links 114. The link information associated with the links 114 may include technology-independent link information, such as link weight information indicative of link weights of the links 114, link capability information indicative of the capabilities of the links 114 (e.g., total bandwidth which could be supported, available bandwidth that is current available, or the like), link pairing information which may be used to determine link pairings of links 114 between common node pairs 112 (e.g., link termination point information indicating whether links 114 terminate on the same nodes, link direction information indicating the directions of links 114, protocol type information indicating the protocols used by links 114, or the like), or the like, as well as various combinations thereof. The link information associated with the links 114 may include technology specific link information, such as IP-specific link information for IP-based links (e.g., IP addressing indicating whether links 114 belong to the same IP subnetwork), optical-specific link information for optical links (e.g., fiber identifiers if multiple fibers are present, optical channel identifiers in Dense Wavelength Division Multiplexing (DWDM) line systems, optical line system characteristics such as line rate and modulation format, or the like), or the like. The communication network information may include network topology information describing interconnectivity between nodes 112 of the communication network 110 via links 114 of the communication network 110. The communication network information may include cost information associated with the links 114, which may be measured in various ways (e.g., based on one or more of geographical distance, network distance, latency, or the like, as well as various combinations thereof). The communication network information may include network status information associated with communication network 110 (e.g., element status information associated with elements of communication network 110 (e.g., node status information for nodes 112, link status information for links 114, link bandwidth availability information for links 114, link bandwidth consumption information for links 114), or the like), traffic-related information of communication network 110 (e.g., one or more traffic matrices, congestion information, or the like), or the like, as well as various combinations thereof. The communication network information, or portions thereof, may be represented as a network graph. The network graph at least identifies interconnectivity between the nodes 112 via the links 114 and may include other portions of the communication network information (e.g., per-link cost information, per-link bandwidth information, node information, or the like, as well as various combinations thereof). It will be appreciated that a network graph may be represented using various types of data structures (e.g., one or more linked lists, one or more matrices, or the like, as well as various combinations thereof). The communication network information may be obtained by path determination element 120 in various ways (e.g., based on interaction with communication network 110 using one or more discovery mechanisms, from one or more management systems, from a database that is maintained by or a least accessible to path determination element 120, based on processing performed by path determination element 120, or the like, as well as various combinations thereof). The communication network information may include any other information which may be used for determining communication paths within communication network 110.

The demand information includes information associated with the set of demands for which the set of mutually compatible paths is to be determined. The demand information includes, for each demand in the set of demands, identification of the nodes 112 which are the endpoints of the demand (which also may be referred to herein as the terminal nodes of the demand or, more generally, as the nodes of the demand). The demand information also includes a solution objective for determining the set of mutually compatible paths satisfying the set of demands (e.g., at least one of minimizing a total cost of the set of mutually compatible paths, minimizing a maximum path cost of the set of mutually compatible paths, minimizing a difference between a lowest-cost path of the set of mutually compatible paths and a highest-cost path of the set of mutually compatible paths, or the like, as well as various combinations thereof). The demand information also includes one or more constraints associated with the set of demands. The one or more constraints associated with the set of demands includes at least one solution-level constraint associated with the solution for the set of demands. The at least one solution-level constraint associated with the solution for the set of demands includes a constraint upon which mutual compatibility for the set of mutually compatible paths is based (e.g., the mutually compatible paths are mutually link-disjoint, the mutually compatible paths are mutually node-disjoint, the mutually compatible paths are mutually link-disjoint and node-disjoint, or the like). The at least one solution-level constraint associated with the solution for the set of demands also may include one or more additional constraints to be satisfied by the set of mutually compatible paths for the set of demands (e.g., minimum total cost of the paths, minimum cost variation between the paths, or the like, as well as various combinations thereof). The one or more constraints associated with the set of demands may include, for one or more of the demands of the set of demands, one or more demand-level constraints associated with the demand (e.g., one or more path-level constraints to be satisfied by the path determined for that demand, one or more node-level constraints to be satisfied by any nodes included in the path determined for that demand, one or more link-level constraints to be satisfied by any links included in the path determined for that demand, or the like, as well as various combinations thereof). For example, path-level constraints for a communication path may include a maximum number of hops of the communication path, a maximum cost of the communication path, or the like, as well as various combinations thereof. For example, node-level constraints for a communication path may include a node inclusion list (e.g., listing any nodes 112 required to be included in the communication path), a node exclusion list (e.g., listing any nodes 112 which cannot be included in the communication path), a maximum cost of using a node 112, a maximum power consumption of a node 112, or the like, as well as various combinations thereof. For example, link-level constraints for a communication path may include a maximum cost of a link 114 (e.g., any links 114 exceeding this cost cannot be included in the communication path), a minimum amount of bandwidth which must be supported by a link 114 (e.g., any links 114 having less bandwidth cannot be included in the communication path), or the like, as well as various combinations thereof. For example, a demand may be required to satisfy bandwidth or latency requirements, which can be translated into various constraints for the demand (e.g., a limit on the number of hops, a limit on distance, requirement for use of a particular transport layer (e.g., optical or IP), or the like, as well as various combinations thereof). The one or more constraints associated with the set of demands may include any other constraints which may be considered in determining the set of mutually compatible paths for the set of demands. The demand information for the set of demands may include any other demand-related information which may be used as input in determining the set of mutually compatible paths for the set of demands. The path determination element 120 may obtain the demand information in any suitable manner (e.g., determining demand information for the set of demands from a demand request that requests determination or establishment of paths between the terminal node pairs of the demands in the set of demands, from a customer profile associated with a customer for which the set of paths of the set of demands is to be determined (e.g., from a Service Level Agreement (SLA) or other suitable information), or the like, as well as various combinations thereof.

The path determination element 120 may be configured to determine a set of mutually compatible paths for a set of demands based on the network information and demand information. The path determination element 120 may be configured to determine a set of mutually compatible paths for a set of demands by obtaining the network information, obtaining the demand information, and determining the set of paths for the set of demands by traversing a search tree that is based on the network information and the demand information. The search tree may include, for each of one or more of the demands in the set of demands, an intelligently selected subset of paths out of the full set of potential paths between the nodes of the demand (e.g., selected based one or more of mutual disjointness (e.g., mutual node disjointness, mutual edge disjointness, or the like), path cost, path length, or the like, as well as various combinations thereof. The traversal of the search tree may be performed using any suitable underlying tree traversal process (which may include various modifications and enhancements for improving or even optimizing determination of the set of mutually compatible paths for the set of demands). For example, the traversal process for traversing the search tree may be a version of a shortest path first (SPF) process, a version of a constrained shortest path first (CSPF) process, or the like. These and various other functions of the path determination element may be further understood from a general description of the problem statement for determining a set of mutually compatible paths for a set of demands (which is depicted and described with respect to FIG. 2) and from a general method of determining a set of mutually compatible paths for a set of demands (which is depicted and described with respect to FIG. 3).

The path determination element 120 may be configured to determine the set of mutually compatible paths for the set of demands for various purposes (e.g., for purposes of establishing the set of paths in the communication network 110, for purposes of pre-computing backup paths which may be established in the communication network 110 responsive to a failure in the communication network 110, or the like, as well as various combinations thereof). The path determination element 120 may be configured to determine the set of mutually compatible paths for the set of demands in response to various trigger conditions. For example, the path determination element 120 may determine the set of mutually compatible paths for the set of demands responsive to a request from a customer. For example, the path determination element 120 may determine the set of mutually compatible paths for the set of demands at a particular time responsive to a determination that the set of paths is to be established at the particular time (e.g., based on a customer profile, path scheduling information, or the like). For example, the path determination element 120 may determine the set of mutually compatible paths for the set of demands responsive to a determination that additional communication resources are needed between the terminal nodes of one or more of the demands. For example, the path determination element 120 may determine the set of mutually compatible paths for the set of demands responsive to detection of an event(s) in communication network 110 (e.g., based on a determination that a node(s) 112 has been turned-up in the communication network 110, based on a request from a node 112 (e.g., a request for establishment of a set of LSPs), based on a detection of a failure of a node 112 or a link 114, or the like, as well as various combinations thereof). The path determination element 120 may be configured to determine the set of mutually compatible paths for the set of demands for various other purposes or in response to various other types of trigger conditions.

The path determination element 120 may be implemented within, or associated, with the communication network 110 in various ways. In one embodiment, for example, the path determination element 120 may be implemented as a Path Computation Element (PCE) or as a portion of a PCE. In one embodiment, for example, the path determination element 120 may be implemented as a Provisioning System (PS) or as a portion of a PS. In one embodiment, for example, the path determination element 120 may be implemented as an Element Management System (EMS) or as a portion of an EMS. In one embodiment, for example, the path determination element 120 may be implemented as a Network Management System (NMS) or as a portion of an EMS. In one embodiment, for example, the path determination element 120 may be implemented as a Software Defined Controller or as a portion of a Software Defined Controller. The path determination element 120 may be implemented, or associated with the communication network 110, in various other ways.

It will be appreciated that, although primarily presented with respect to a specific arrangement of communication network 110 (illustratively, specific numbers of nodes 112 and links 114 connected in a specific arrangement), the communication network 110 may include fewer or more nodes 112 or links 114 which may be arranged in various other ways.

Figure 2:
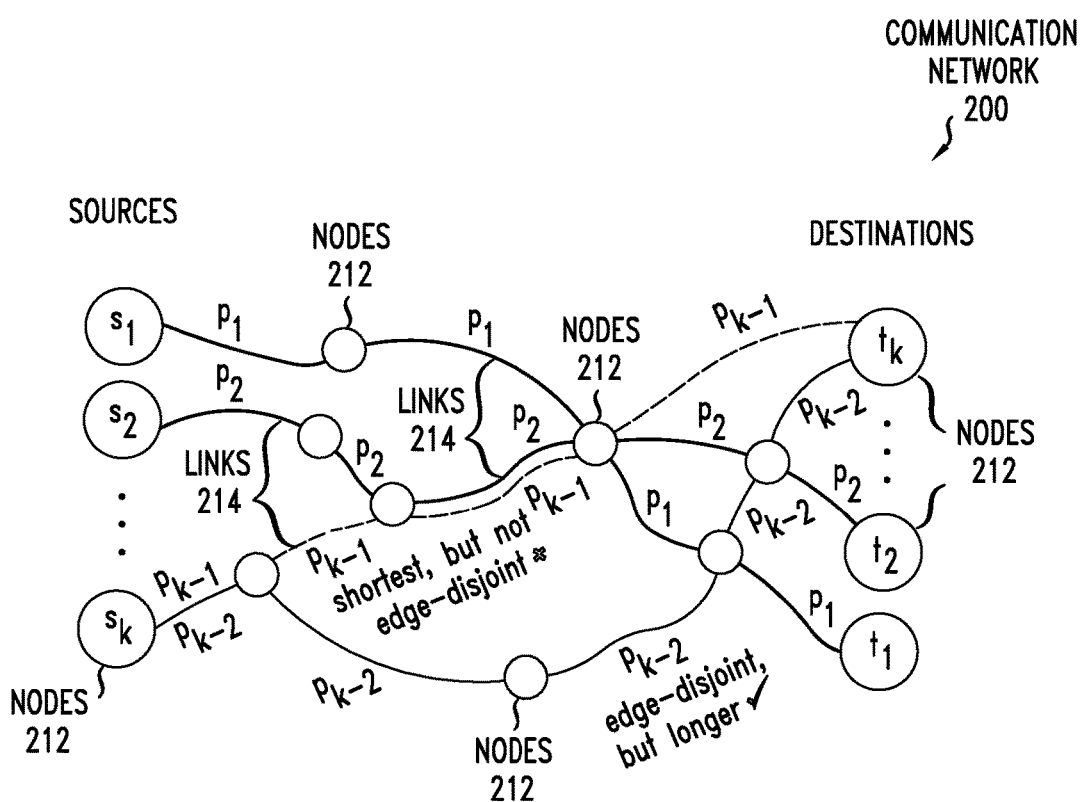
FIG. 2 depicts an exemplary system including a communication network for illustrating a set of demands and a definition of determining a set of mutually compatible paths for the set of demands.

FIG. 2 depicts an exemplary a communication network for illustrating a set of demands and a problem definition for the problem of determining a set of mutually compatible paths for the set of demands.

As depicted in FIG. 2, communication network 200 includes nodes 212 and links 214 connecting the nodes 212. The communication network 200 of FIG. 2 may correspond to a portion of communication network 110 of FIG. 1. The nodes 212 include (1) source nodes and destination nodes associated with the set of demands for which communication paths are to be determined and (2) intermediate nodes that are available for selection for inclusion in the communication paths to be determined for the set of demands.

As depicted in FIG. 2, a set of k demands is provided as input and the goal is to find a set of k paths for the set of k demands where the set of k paths for the set of k demands are mutually compatible paths (which, in this example, is based on edge disjointness) and have minimum total cost. As depicted in FIG. 2, each of the k demands $d_i$ specifies a source node $s_i$ and a destination node $t_i$, where i=1 ... k, k≥2. As depicted in FIG. 2, a path $p_i$ is determined for each demand $d_i$, where the path $p_i$ for a demand $d_i$ is a path from the source node $s_i$ of the demand $d_i$ to the destination node $t_i$ of the demand $d_i$. As depicted in FIG. 2, the shortest path of demand $d_k$ (indicated with the dashed line) shares an edge with the path of demand d2 (such that these paths are not mutually link-disjoint and, thus, cannot be used within the set of paths $p_i$ for the set of demands $d_i$) and, as a result, a longer path is determined for demand $d_k$ where the longer path for demand $d_k$ is mutually link-disjoint with respect to paths $p_1$-$p_{k-1}$ of demands $d_1$-$d_{k-1}$. The problem definition for the problem of determining the set of mutually compatible paths $p_i$ for the set of demands $d_i$ is discussed further below.

As discussed above, the goal is to find a set of k paths for the set of k demands where the set of k paths for the set of k demands are mutually compatible paths (which, in this example, is based on edge disjointness) and have minimum total cost. This problem may be more formally defined as follows. The following inputs are given: (1) a network graph $G \triangleq (V, E)$ (undirected) with node (or vertex) set V and edge set E representing some aspect of the network topology (which may be represented using any suitable type of network graph representation, such as a matrix-based representation, a linked list based representation, or the like), (2) a mapping c: $E \mapsto \mathbb{R}^+$ of costs (or weights) for each edge, and (3) a set $D \triangleq \{d_1, \ldots, d_k\}$ of k demands between distinct terminal pairs $d_i \triangleq (s_i, t_i) \in V \times V$ (Cartesian product), i.e., source-termination node pairs where $\forall i, j \in \{1, \ldots k\}$, $s_i \neq s_j$, $s_i \neq t_j$, $t_i \neq t_j$. The problem may be stated as follows: find a (simple) path $p_i$ in G for each demand $d_i$ in D where the set P of paths $\{p_1, \ldots, p_k\}$ are mutually edge-disjoint (constraint) and have minimum total cost (objective). It is noted that edge "cost" or "weight" is a general notion within the context of graph search problems (and may be based on various types of metrics); for the cost minimization problem considered here, the basic requirement is that edge cost be a non-negative monotonically non-increasing function of edge preferability such that lower-cost edges are to be preferred over higher-cost edges. For example, suitable edge cost metrics may include distance, delay, bandwidth, congestion, popularity, inverse residual bandwidth, approximate link (including interface) capacity augmentation costs, or the like, as well as various combinations thereof. It is further noted that, although embodiments of the path search mechanism for determining mutually compatible paths are primarily depicted and described herein within the context of a particular problem definition (for purposes of clarity in describing embodiments of the path search mechanism), various embodiments of the path search mechanism for determining mutually compatible paths may be used, or adapted for use, in handling variations of this particular problem definition. For example, potential variations of this particular problem definition may include one or more of the network graph G being a directed graph (which may be useful, e.g., when the cost matrix is not symmetric, i.e., the cost of traversing a link in one direction differs from that of traversing the link in the reverse direction), allowing terminal nodes to coincide (e.g., allow $s_i = s_j$, $t_i = t_j$, and/or $s_i = t_j$ for some i≠j (but always forbid loopbacks: $s_i \neq t_i \forall i$)), use of other solution-level objectives (e.g., minimizing maximum cost, minimizing cost variation, or the like), use of other solution-level constraints (e.g., paths $p_i$ for the set of demands are mutually edge-disjoint and node-disjoint, minimizing the costliest path $p_i$, minimizing a difference between the least costly path $p_i$ and the most costly path $p_i$, or the like), use of other variations of demand-level/path-level constraints (e.g., minimum bandwidth variations among the demands $d_i$, maximum path cost variations among the demands $d_i$, or the like), use of variations of node-level constraints of demands $d_i$, use of variations of link-level constraints of demands $d_i$, or the like, as well as various combinations thereof. It is noted that various embodiments of the path search mechanism for determining mutually compatible paths may be used, or adapted for use, in handling various other problem variations and extensions. An exemplary method for determining a set of mutually compatible paths for a set of demands is depicted and described with respect to FIG. 3.

Figure 3:
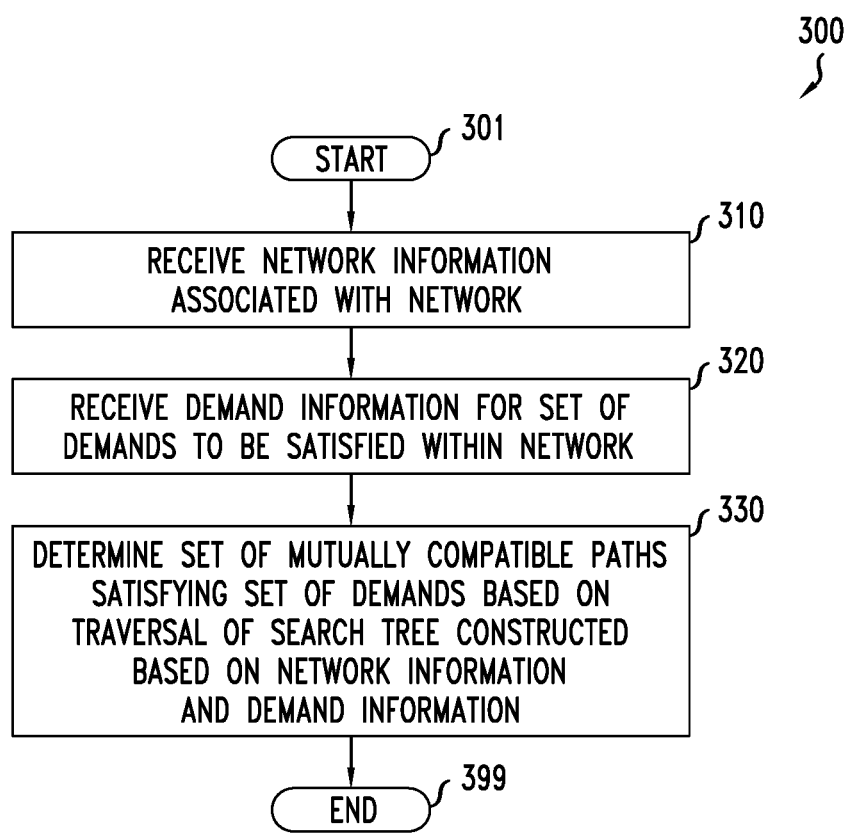
FIG. 3 depicts a flow diagram of a method for determining a set of mutually compatible paths satisfying a set of demands.

FIG. 3 depicts a flow diagram of a method for determining a set of mutually compatible paths satisfying a set of demands. It will be appreciated that, although primarily depicted and described herein as being performed serially, at least a portion of the functions of method 300 may be performed contemporaneously or may be performed in a different order than as presented in FIG. 3.

At block 301, method 300 begins.

At block 310, network information associated with a network is received. The network includes a set of nodes and a set of links. The network information may include any network information suitable for use in determining paths between pairs of nodes of the network. The network information may include network topology information indicative of interconnectivity between the nodes of the network via links of the network, and may include one or more additional types of information which may be associated with the network topology information (e.g., per-link cost information, per-link congestion information, or the like). The network information, or portions thereof, may be represented as a network graph (which may be represented using network graph information that describes the network graph). The network graph at least identifies interconnectivity between the nodes of the network via the links of the network, and may include other type of information (e.g., per-link cost information, per-link bandwidth information, node information, or the like, as well as various combinations thereof). It will be appreciated that a network graph may be represented using various types of data structures (e.g., one or more linked lists, one or more matrices, or the like, as well as various combinations thereof). Similarly, the network information may be represented using various types of data structures (e.g., one or more linked lists, one or more matrices, or the like, as well as various combinations thereof). It is noted that the network information may represent, of the entire potential network, those portions of the network available to support paths (e.g., removing various elements of the network (e.g., failed nodes, congested links, unsuitable links, or the like) from being consideration during path determination).

At block 320, demand information associated with a set of demands to be satisfied within the network is obtained. The set of demands includes two or more demands. The demand information includes, for each of the demands, identification of the terminal nodes of the respective demand. The demand information includes the criteria upon which mutual compatibility of the mutually compatible paths satisfying the set of demands is based (e.g., edge disjointness, node disjointness, edge and node disjointness). The demand information includes a solution-level objective for determining the mutually compatible paths satisfying the set of demands. The demand information may include information indicative as to whether the demands are order independent or order dependent. The demand information may include one or more constraints associated with the set of demands (e.g., one or more of one or more solution-level constraints, one or more per-demand demand-level constraints, one or more node-level constraints, one or more link-level constraints, or the like, as well as various combinations thereof. The demand information also may include any inputs related to the manner in which the mutually compatible paths satisfying the set of demands is based are to be determined (e.g., a minimum number of potential solutions, a maximum number of potential solutions, parameters related to pruning of infeasible or non-optimal solutions, or the like, as well as various combinations thereof).

At block 330, a set of mutually compatible paths satisfying the set of demands is determined based on a traversal of a search tree constructed or computed based on the network information associated with the network and the demand information associated with the set of demands.

The search tree may be pre-computed (pre-constructed) and then traversed, computed (constructed) as it is being traversed (e.g., computing new branches of the search tree as traversal to new branches of the search tree is required, which may only result in construction of a portion of the entire search tree that could be constructed based on the network information associated with the network and the demand information associated with the set of demands), or the like. The search tree may be constructed in various ways. The search tree may be constructed by determining search tree input information and constructing the search tree based on the search tree input information. The search tree input information may include network information associated with the network within which the set of demands is to be satisfied (e.g., network topology information and, optionally, additional information (e.g., cost information or the like)), demand information associated with the set of demands to be satisfied, or the like, as well as various combinations thereof. The search tree may be constructed by determining, for each demand, a set of candidate paths for the demand and arranging the sets of candidate paths for the demands into a tree-based arrangement to form thereby a search tree for use in determining a set of mutually compatible paths in the network that satisfy the set of demands in the network. The candidate paths for a given demand, as discussed herein, may include all potential paths for the demand, a subset of the potential paths for the demand, or the like. The search tree may be constructed using a top-down approach, in a direction from a root of the search tree toward the leaves of the search tree, such that construction of a current hierarchical level of the search tree is completed before the next hierarchical level of the search tree is constructed. For example, for two demands each having two candidate paths associated therewith, the first demand may be selected, a root vertex may be created to represent the first demand, two edges (representing the two paths of the first demand) may be created from the root vertex of the first demand to two vertices created to represent the second demand, and two edges may be created from each of the two vertices of the second demand to provide four total search tree paths (representing the four possible combinations of the pairs of candidate paths associated with the two demands) within the search tree. The search tree may be constructed using a top-down approach, in a direction from a root of the search tree toward the leaves of the search tree, such that construction of the potential solution paths of the search tree is prioritized over construction of the hierarchical levels. For example, for two demands each having two candidate paths associated therewith, the first demand may be selected, a root vertex may be created to represent the first demand, a first edge (representing a first of the two paths of the first demand) may be created from the root vertex of the first demand to a first vertex created to represent the second demand, two edges may be created from the first vertex created to represent the second demand to represent the two candidate paths of the second demand (representing two of the four possible combinations of the pairs of candidate paths associated with the two demands), a second edge (representing a second of the two paths of the first demand) may be created from the root vertex of the first demand to a second vertex created to represent the second demand, and two edges may be created from the second vertex created to represent the second demand to represent the two candidate paths of the second demand (representing the other two of the four possible combinations of the pairs of candidate paths associated with the two demands). The search tree may be constructed in various other ways. The constructed search tree may be represented or described using search tree output information, which may be provided in various formats or using various types of data structures.

The search tree includes, for each demand, a respective set of candidate paths between the terminal nodes of the respective demand which are being considered for selection to satisfy the respective demand. The search tree is arranged such that the demands are represented by vertices within the search tree and potential paths satisfying the demands are represented by edges within the search tree. For example, where a first demand d1 is being considered first (and three potential paths demand1_p1, demand1_p2, and demand1_p3 are being considered for selection for the first demand d1) and a second demand d2 is being considered second (and two potential paths demand2_p1 and demand_p2 are being considered for selection for the first demand d1), the search tree may be constructed as follows: (a) the root vertex of the search tree identifies demand d1, (b) the root vertex of the search tree has three branches extending therefrom which correspond to the three potential paths demand1_p1, demand1_p2, and demand1_p3 that are being considered for selection to satisfy the first demand d1, and (c) each of the three branches extending from the root vertex ends at a respective vertex that identifies demand d2 and has two branches extending therefrom which correspond to the two potential paths demand2_p1 and demand2_p2 that are being considered for selection to satisfy the first demand d1. The search tree may be constructed such that it is demand-order independent or demand-order dependent.

The search tree, as discussed above, includes, for each demand, a respective set of potential paths between the terminal nodes of the respective demand which are being considered for selection to satisfy the respective demand. The set of potential paths between the terminal nodes of a given demand, which are being considered for selection to satisfy the given demand, may include all potential paths between the terminal nodes of a given demand or may be a subset of potential paths between the terminal nodes of a given demand in order to reduce the number of potential paths that need to be considered in determining the set of mutually compatible paths satisfying the set of demands. In at least some embodiments, for at least one of the demands, the subset of potential paths between the terminal nodes of the respective demand may be intelligently selected. In at least some embodiments, for at least one of the demands, the subset of potential paths between the terminal nodes of the respective demand may include a set of mutually disjoint paths between the terminal nodes of the respective demand. The set of mutually disjoint paths for the demand may include all mutually disjoint paths between the terminal nodes of the demand or a subset of all of the mutually disjoint paths between the terminal nodes of the demand. The subset of mutually disjoint paths between the terminal nodes of the demand may be the first X mutually disjoint paths identified for the demand (e.g., X 2, but less than the total number of all of the mutually disjoint paths for the demand), mutually disjoint paths for the demand that are selected based on selection criteria (e.g., least-cost, shortest, or the like, as well as various combinations thereof), or the like, as well as various combinations thereof. The set of mutually disjoint paths for the demand may be determined using any process or algorithm suitable for determining a set of mutually disjoint paths between a pair of nodes in a network (e.g., the Suurballe-Tarjan algorithm, the Bhandari algorithm, or the like). The subset of potential paths between the terminal nodes of the respective demand may be prioritized with respect to each other to provide a priority ordering of the potential paths (e.g., based on at least one of path length, path cost, or the like) and may be evaluated during traversal of the search tree based on the priority ordering of the potential paths.

The traversal of the search tree may be performed using any suitable underlying tree traversal process or algorithm.

The traversal of the search tree to determine the set of mutually compatible paths satisfying the set of demands may be performed in various ways. For example, the search tree may be traversed until the first set of mutually compatible paths satisfying the set of demands is identified and then traversal of the search tree may be terminated and the first set of mutually compatible paths satisfying the set of demands that was identified may be used as the solution for the set of demands. For example, the search tree may be traversed until X sets of mutually compatible paths satisfying the set of demands have been identified (or traversal of the search tree is complete and less than X sets of mutually compatible paths satisfying the set of demands have been identified) and the X (or less than X) identified sets of mutually compatible paths may then be analyzed to select one of the X (or less than X) identified sets of mutually compatible paths as the solution for the set of demands (e.g., selecting the identified set of mutually compatible paths having the lowest cost, selecting the set of mutually compatible paths having a minimum difference between the least costly path and the most costly path, or the like). For example, the search tree may be traversed until all sets of mutually compatible paths satisfying the set of demands have been identified and the identified sets of mutually compatible paths may then be analyzed to select one of the identified sets of mutually compatible paths as the solution for the set of demands (e.g., selecting the identified set of mutually compatible paths having the lowest cost, selecting the set of mutually compatible paths having a minimum difference between the least costly path and the most costly path, or the like).

The traversal of the search tree to determine the set of mutually compatible paths satisfying the set of demands may be performed in a manner for pruning branches of the search tree, during the traversal of the search tree, under various conditions. The pruning of branches of the search tree generally accelerates the traversal of the search tree by eliminating infeasible or non-optimal branches from the search tree. For example, where the set of demands has a solution-level constraint associated therewith (e.g., maximum total cost of the set of mutually compatible paths, minimum difference between costs of the mutually compatible paths, or the like), the solution-level constraint may be tracked during traversal of the search tree such that if, at any point, the currently identified set of mutually compatible paths does not satisfy the solution-level constraint then traversal of the current branch of the search tree may be stopped (thereby pruning the remainder of the current branch from the search tree), the currently identified set of mutually compatible paths may be discarded, and the traversal of the search tree may continue (at a next feasible branch of the search tree) to try to identify the next set of mutually compatible paths satisfying the set of demands. For example, where a set of mutually compatible paths satisfying the set of demands has been identified, but traversal of the search tree continues to try to identify a better set of mutually compatible paths satisfying the set of demands (e.g., better in terms of some solution-level constraint such as maximum total cost of the set of mutually compatible paths, minimum difference between costs of the mutually compatible paths, or the like), the solution-level constraint may be tracked during the continuing traversal of the search tree such that if, at any point, the currently identified set of mutually compatible paths for the next traversal of the search tree does not meet or outperform the identified set of mutually compatible paths satisfying the set of demands, traversal of the current branch of the search tree may be stopped (thereby pruning the remainder of the current branch from the search tree), the currently identified set of mutually compatible paths may be discarded (since, even if completed, the currently identified set of mutually compatible paths cannot provide a better solution), and the traversal of the search tree may continue (at a next feasible branch of the search tree) to try to identify the next set of mutually compatible paths satisfying the set of demands. It will be appreciated that the search tree may be pruned responsive to various other conditions.

The traversal of the search tree to determine the set of mutually compatible paths satisfying the set of demands may be performed in a manner for truncating the traversal of the search tree under various conditions. The truncation of the traversal of the search tree stops the traversal of the search tree, which may conserve resources where further traversal of the search tree is not expected to be useful. For example, where the set of demands has a solution-level constraint associated therewith (e.g., maximum total cost of the set of mutually compatible paths, minimum difference between costs of the mutually compatible paths, or the like), the solution-level constraint may be tracked during traversal of the search tree such that if, at any point, the currently identified set of mutually compatible paths does not satisfy the solution-level constraint then traversal of the search tree may be truncated based on a determination that there are no additional branches of the search tree that can result in identification of a set of mutually compatible paths satisfying the set of demands. For example, where a set of mutually compatible paths satisfying the set of demands has been identified, but traversal of the search tree continues to try to identify a better set of mutually compatible paths satisfying the set of demands (e.g., better in terms of some solution-level constraint such as maximum total cost of the set of mutually compatible paths, minimum difference between costs of the mutually compatible paths, or the like), the solution-level constraint may be tracked during the continuing traversal of the search tree such that if, at any point, the currently identified set of mutually compatible paths for the next traversal of the search tree does not meet or outperform the identified set of mutually compatible paths satisfying the set of demands and a maximum limit on the number of attempts to identify a set of mutually compatible paths for the set of demands has been reached, traversal of the current branch of the search tree may be truncated. It will be appreciated that the traversal of the search tree may be truncated responsive to various other conditions.

Figure 4:
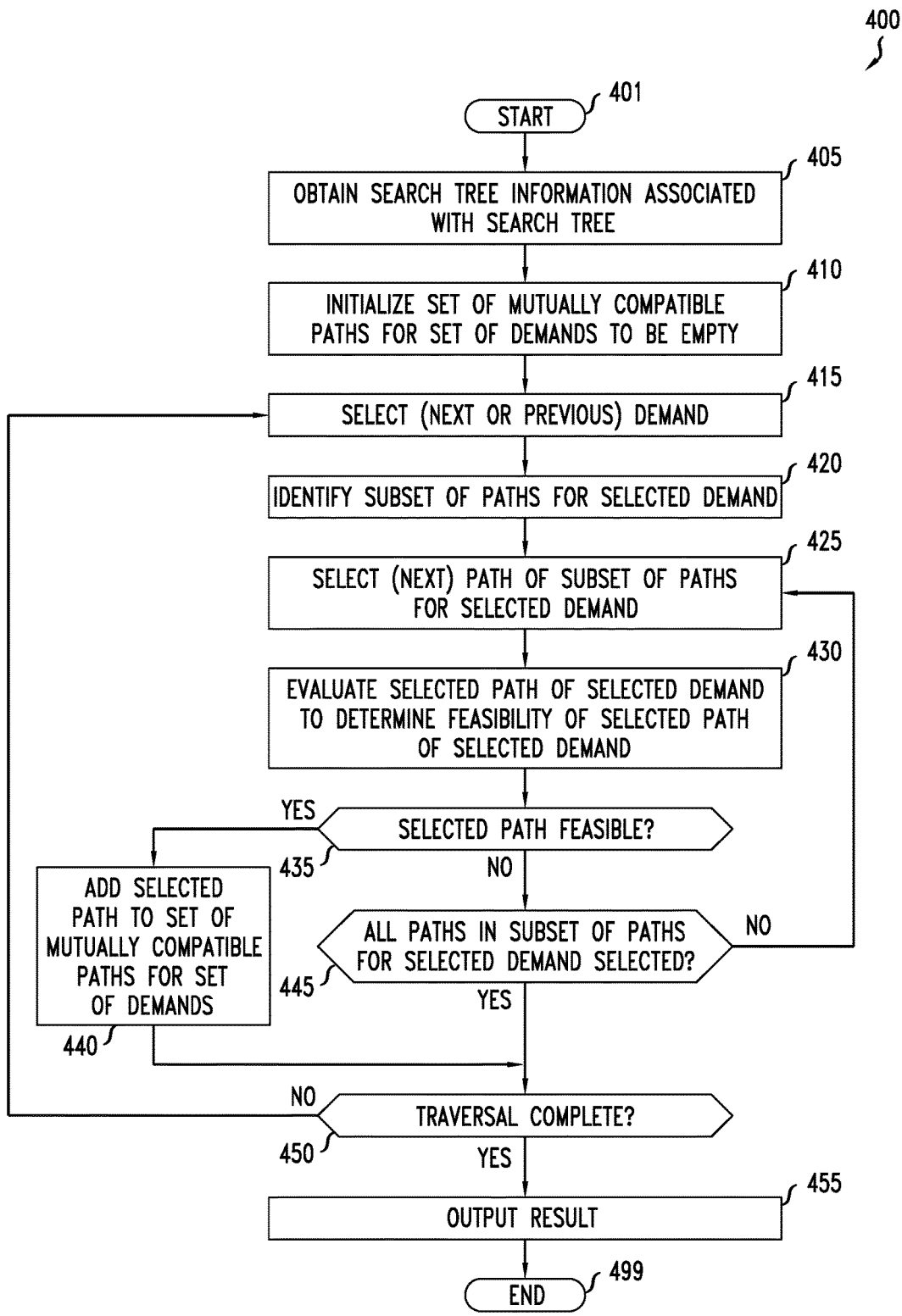
FIG. 4 depicts a flow diagram of a method for traversing a search tree, constructed based network information and demand information, to determine a set of mutually compatible paths satisfying the set of demands.
Figure 5:
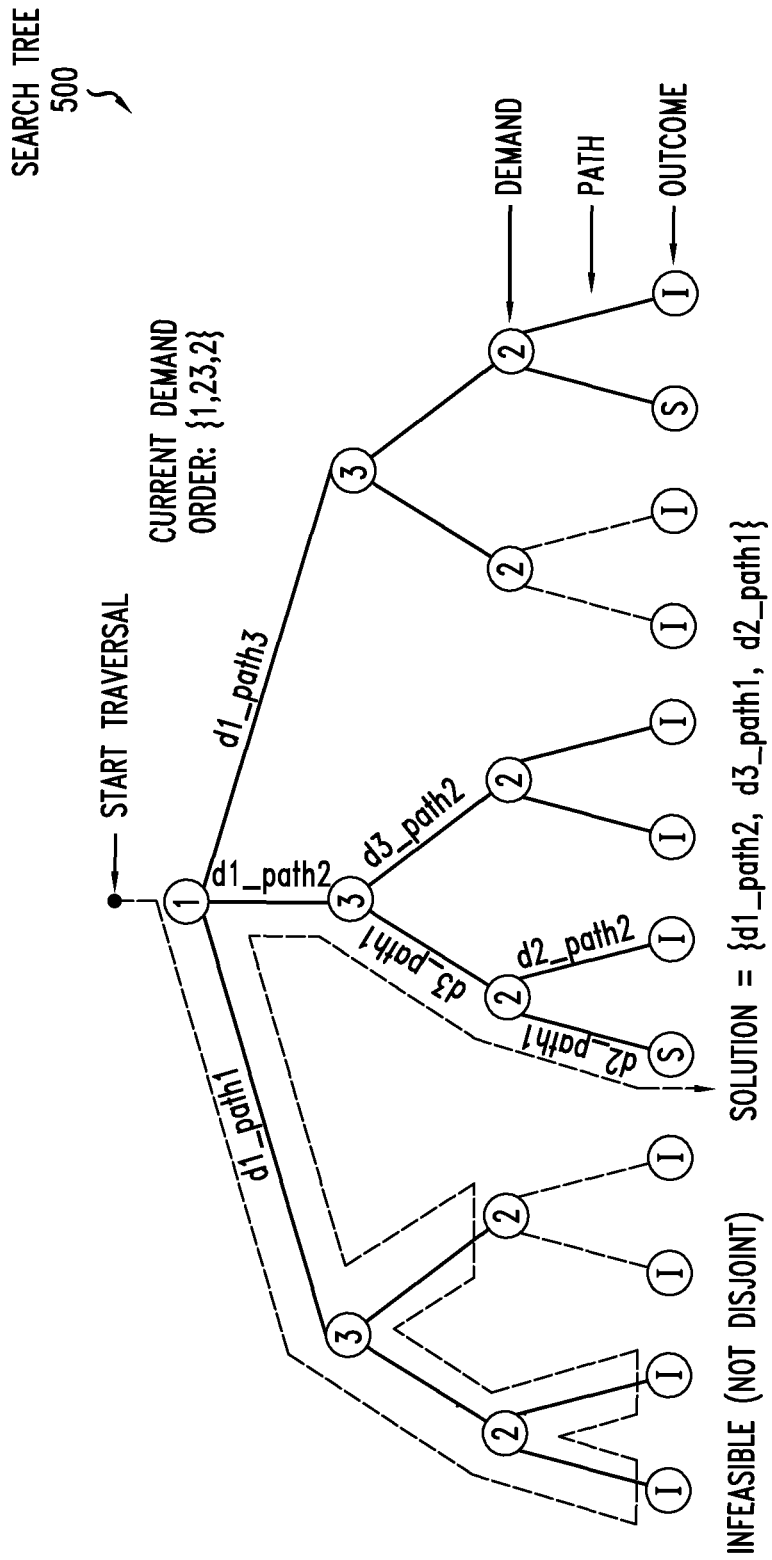
FIG. 5 depicts an exemplary search tree for illustrating traversal of a search tree, constructed based network information and demand information, to determine a set of mutually compatible paths satisfying the set of demands.

The traversal of the search tree to determine the set of mutually compatible paths satisfying the set of demands may be further understood by way of reference to the exemplary search tree traversal method of FIG. 4 and the exemplary search tree of FIG. 5, which illustrate at least some of the features discussed above within the context of method 300 of FIG. 3.

At block 399, method 300 ends.

FIG. 4 depicts a flow diagram of a method for traversing a search tree, constructed based network information and demand information, to determine a set of mutually compatible paths satisfying the set of demands. It will be appreciated that method 400 of FIG. 4 may be used to provide block 330 of method 300 of FIG. 3. It will be appreciated that, although primarily depicted and described herein as being performed serially, at least a portion of the functions of method 400 may be performed contemporaneously or may be performed in a different order than as presented in FIG. 4.

At block 401, method 400 begins.

At block 405, search tree information associated with the search tree is obtained. The search tree information may include search tree description information describing the search tree (e.g., where the search tree is pre-computed prior to traversal of the search tree) or information which may be used to compute the search tree (e.g., network information, demand information, or the like, as well as various combinations thereof).

At block 410, the set of mutually compatible paths is initialized. The set of mutually compatible paths is initialized to be empty (since, at this point, no paths have been selected as a solution for the set of demands). It will be appreciated that, although omitted for purposes of clarity, one or more other inputs or associated variables may be initialized before traversal of the search tree begins.

At block 415, a (next or previous) demand is selected. In a first pass through block 415 of method 400, a first demand at the root of the search tree is selected. In subsequent passes through block 415 of method 400, the demand that is selected next may be a next demand selected based on a forward traversal within the search tree (i.e., closer to the leaf nodes of the search tree) or a previous demand selected based on a reverse traversal (backtracking) within the search tree (i.e., closer to the root node of the search tree). The order in which the demands are selected may be pre-determined where the demands are order-dependent or determined on-the-fly where the demands are order-independent (e.g., selected randomly, intelligently, or the like).

At block 420, a subset of paths is identified for the selected demand. The subset of paths for the selected demand may have been predetermined (e.g., prior to execution of method 400) or may be determined on-the-fly (e.g., at block 420, in conjunction with execution of method 400). The subset of paths for the selected demand may be determined on-the-fly by determining a current set of mutually compatible paths identified during the traversal of the search tree, removing, from consideration for use in determining the set of potential paths between the respective nodes of the respective demand, any links associated with the current set of mutually compatible paths to provide a set of links remaining for consideration, determine the set of potential paths between the respective nodes of the respective demand based on the set of links remaining for consideration, and select the subset of paths for the respective demand from the set of potential paths between the respective nodes of the respective demand. The subset of paths for the selected demand may be determined on-the-fly by constructing a residual graph by removing from the network graph all links from paths in the current set of mutually compatible paths and then determining the subset of paths for the selected demand from the residual graph (e.g., by determining candidate paths for the selected demand based on the residual graph and selecting the subset of paths for the selected demand from among the candidate paths). The subset of paths for the selected demand includes one or more paths between the terminal nodes of the demand. The subset of paths for the selected demand may be determined in various ways, which may depend on the criteria upon which determination of the subset of paths is based (e.g., mutual disjointness, path length, path cost, or the like, as well as various combinations thereof). For example, the subset of paths for the selected demand may include two or more shortest, mutually disjoint paths between the terminal nodes of the selected demand. The determination of the subset of paths for the selected demand also may include evaluations of the potential paths of the demand (e.g., potential paths available for selection as the subset of paths for the selected demand) based on any per-demand constraints specified for the selected demand (e.g., evaluating the potential paths with respect to one or more of one or more path-level constraints for the selected demand, one or more node-level constraints for the selected demand, one or more link-level constraints for the selected demand, or the like, as well as various combinations thereof), although it will be appreciated that at least a portion of such evaluations may be performed at other points within method 400 (e.g., at block 430 when a selected path from the subset of paths is evaluated for mutual compatibility with paths included in the set of mutually compatible paths for the set of demands, so as to exclude the selected path from the set of mutually compatible paths for the set of demands based on a determination that the selected path does not satisfy the constraints specified for the selected demand). It will be appreciated that, although primarily depicted and described with respect to an embodiment in which the entire subset of paths for the selected demand is identified before evaluation of any of the paths of the selected demand, in at least some embodiments the paths in the subset of paths of the selected demand may be identified one-by-one on-the-fly as they are needed for evaluation during traversal of the search tree.

At block 425, a (next) path of the subset of paths for the selected demand is selected. In a first pass through block 425 of method 400, the first path of the subset of paths is selected. In each subsequent pass through block 425, the next path of the subset of paths is selected. The order in which the subset of paths of the demand are selected for evaluation may depend on various criteria (e.g., path length beginning with the shortest path, path cost being selected beginning with the least-cost path, or the like). The order in which the subset of paths of the demand are selected for evaluation may be determined at block 420 or in each pass through block 425.

At block 430, the selected path of the subset of paths for the selected demand is evaluated to determine the feasibility of the selected path of the subset of paths for the selected demand. The determination of feasibility of the selected path at least includes an evaluation of the selected path with respect to any paths that are included in the set of mutually compatible paths to determine mutual compatibility of the selected path of and any paths that are included in the set of mutually compatible paths. The determination of feasibility of the selected path also may include any other evaluations of the selected path based on any other constraints specified for the selected demand (e.g., evaluating the path with respect to one or more of one or more path-level constraints for the selected demand, one or more node-level constraints for the selected demand, one or more link-level constraints for the selected demand, or the like, as well as various combinations thereof), although it will be appreciated that at least a portion of such other evaluations may be performed at other points within method 400 (e.g., at block 420 when the subset of paths is identified, so as to exclude from the identified subset of paths for the selected demand any paths that do not satisfy the constraints specified for the selected demand).

At block 435, a determination is made as to whether the selected path for the selected demand is feasible. The determination as to whether the selected path for the selected demand is feasible is based on the evaluation of the selected path that is performed at block 430. The selected path for the selected demand may be determined to be feasible based on a determination that the selected path is mutually compatible with the any paths that are included in the set of mutually compatible paths. The selected path for the selected demand may be determined to be feasible based on a determination that the selected path is mutually compatible with the any paths that are included in the set of mutually compatible paths and, when any additional constraints associated with the selected demand are evaluated, that the additional constraints associated with the selected demand are satisfied. If the selected path for the selected demand is determined to be feasible, method 400 proceeds to block 440. If the selected path for the selected demand is determined not to be feasible, method 400 proceeds to block 445.

At block 440, the selected path for the selected demand is added to the set of mutually compatible paths. The selected path for the selected demand is added to the set of mutually compatible paths based on a determination at block 435 that the selected path of the selected demand is feasible. From block 440, method 400 proceeds to block 450.

At block 445, a determination is made as to whether all of the paths in the subset of paths of the selected demand have been selected. This determination is based on a determination at block 435 that the selected path of the selected demand is infeasible (to determine whether there are any paths in the subset of paths of the selected demand left to evaluate for feasibility). If all of the paths in the subset of paths of the selected demand have not been selected (and, thus, all paths in the subset of paths of the selected demand have been not evaluated for feasibility and there is at least one additional path of the selected demand that is available for evaluation), method 400 returns to block 425 (at which point a next path is the subset of paths of the selected demand is selected for evaluation for feasibility). If all of the paths in the subset of paths of the selected demand have been selected (and, thus, all paths in the subset of paths of the selected demand have been evaluated for feasibility and there are no additional paths of the selected demand that are available for evaluation), method 400 proceeds to block 450.

At block 450, a determination is made as to whether traversal of the search tree is complete. The traversal of the search tree may be complete, because all of the demands in the set of demands have been evaluated and a feasible solution has been identified for the set of demands such that the set of mutually compatible paths includes, for each demand in the set of demands, a respective path for the demand. Alternatively, the traversal of the search tree may be complete, because a feasible solution has not been identified and there are no additional branches available in the search tree (or no additional branches of the search tree that could result in a feasible solution for the set of demands). If traversal of the search tree is not complete, method 400 returns to block 415, at which point a subsequent demand is selected. The subsequent demand may be a next demand in the search tree (e.g., in a forward direction from the root node of the search tree toward the leaf nodes of the search tree) when the determination at block 435 is that one of the paths in the subset of paths of the selected demand is feasible (i.e., when method 400 proceeds to block 450 via block 440). The subsequent demand may be a previous demand in the search tree (e.g., backtracking in a reverse direction from the leaf nodes of the search tree toward the root node of the search tree) when the determination at block 435 is that none of the paths in the subset of paths of the selected demand is feasible (i.e., when method 400 proceeds to block 450 via block 445). It is noted that, where the subsequent demand is a previous demand such that backtracking is performed, one or more mutually compatible paths will be removed from the current set of mutually compatible paths (depending on the level of backtracking required before proceeding down the next branch of the search tree). If traversal of the search tree is complete, method 400 proceeds to block 455.

At block 455, a result of the traversal of the search tree is output. The result may be a positive result identifying a feasible solution that has been identified for the set of demands such that the set of mutually compatible paths includes, for each demand in the set of demands, a respective path for the demand. The outputting of the positive result may include storing the feasible solution, initiating display of the feasible solution, sending a message including the feasible solution, initiating establishment of paths for the demands based on the feasible solution, or the like, as well as various combinations thereof. The positive result for the feasible solution may include information describing the feasible solution. The result may be a negative result indicating that a feasible solution has not been identified for the set of demands. The negative result indicating that a feasible solution has not been identified for the set of demands may include various types of information associated with the negative result. The outputting of the negative result may include storing the indication of the negative result (and information associated with the negative result), initiating display of the indication of the negative result (and information associated with the negative result), sending a message including the indication of the negative result (and information associated with the negative result), or the like, as well as various combinations thereof.

At block 499, method 400 ends.

It will be appreciated that method 400 of FIG. 4 is merely one example of a method for traversing a search tree for determining a set of mutually compatible paths for a set of demands. It will be appreciated that method 400 of FIG. 4 may be modified in various ways to provide various other functions (e.g., pruning of infeasible or non-optimal branches of the search tree, truncating traversal of the search tree based on various conditions, identification of multiple solutions and selection between the multiple solutions to identify an optimal solution, or the like, as well as various combinations thereof) which may be used to improve or optimize traversal of a search tree in order to determine a set of mutually compatible paths for a set of demands. For example, although method 400 includes an embodiment in which all of the paths in the subset of paths of the selected demand are not considered after one of the paths in the subset of paths of the selected demand is determined to be feasible (illustratively, the transition from block 435 to block 440), in at least some embodiments method 400 may be adapted to evaluate all of the paths in the subset of paths of the selected demand (even after one of the paths in the subset of paths of the selected demand is determined to be feasible) as it is possible that use of one of these other paths may provide a better solution. The use of such other functions is depicted and described with respect to FIGS. 1-3.

FIG. 5 depicts an exemplary search tree for illustrating traversal of a search tree, constructed based network information and demand information, to determine a set of mutually compatible paths satisfying the set of demands.

As depicted in FIG. 5, the search tree 500 is constructed for a set of three demands denoted as demands d1, d2 and d3. The search tree 500 is constructed based on a demand order of {d1, d3, d2}. The subset of paths for demand d1 has three paths associated therewith (d1_path1, d1_path2, and d1_path3), the subset of paths for demand d2 has two paths associated therewith (d2_path1 and d2_path2), and the subset of paths for demand d3 has two paths associated therewith (d3_path1 and d3_path2). The search tree 500 has three hierarchical levels associated with the three demands as follows (where demand order dictates the hierarchical levels): a root vertex at the first hierarchical level corresponds to demand d1, three vertices at the second hierarchical level correspond to demand d3, and six vertices at the third hierarchical level correspond to demand d2. The search tree 500 includes edges between the vertices as follows: (1) from the root vertex of demand d1 at the first hierarchical level, three edges connecting the root vertex of demand d1 to the three vertices of demand d3 at the second hierarchical level where the three edges correspond to the three paths in the subset of paths for demand d1, (2) from each of the three vertices of demand d3 at the second hierarchical level, two edges connecting the respective vertex of demand d3 to two vertices of demand d2 at the third hierarchical level where the two edges correspond to the two paths in the subset of paths for demand d3, and (3) from each of the six vertices of demand d2 at the third hierarchical level, two edges connecting the respective vertex of demand d2 to two solution leaf vertices where the two edges correspond to the two paths in the subset of paths for demand d2. Accordingly, given that all combinations of the paths in the subset of paths of the three demands (namely, 3×2×2=12) are represented as potential solutions for the search tree 500, the search tree 500 includes 12 solution leaf vertices.

As depicted in FIG. 5, the traversal of the search tree 500 is indicated by a dashed line showing the order in which the paths of the demands are evaluated. The twelve potential solutions for the set of demands are marked as feasible (S) or infeasible (I) based on traversal of the search tree 500. The traversal begins at the root vertex corresponding to demand d1. The first path d1_path1 in the subset of paths of demand d1 is selected for evaluation. The first path d1_path1 in the subset of paths of demand d1 is evaluated and determined to be feasible, so the search tree is traversed along the edge corresponding to the first path d1_path1 in the subset of paths of demand d1 to arrive at the first vertex corresponding to demand d3 at the second hierarchical level. The first path d3_path1 in the subset of paths of demand d3 is evaluated and determined to be feasible, so the search tree is traversed along the edge corresponding to the first path d3_path1 in the subset of paths of demand d3 to arrive at the first vertex corresponding to demand d2 at the third hierarchical level. The first path d2_path1 in the subset of paths of demand d2 is evaluated and determined not to be feasible, so the search tree is traversed by backtracking along the edge corresponding to the first path d2_path1 in the subset of paths of demand d2 to arrive back at the first vertex corresponding to demand d2 at the third hierarchical level. The second path d2_path2 in the subset of paths of demand d2 is evaluated and determined not to be feasible, so the search tree is traversed by backtracking along the edge corresponding to the second path d2_path2 in the subset of paths of demand d2 and the also along the edge corresponding to the first path d3_path1 in the subset of paths of demand d3 to arrive at the first vertex corresponding to demand d3 at the second hierarchical level. The second path d3_path2 in the subset of paths of demand d3 is evaluated and determined not to be feasible, so the search tree is traversed by backtracking along the edge corresponding to the second path d3_path2 in the subset of paths of demand d3 and also along the edge corresponding to the first path d1_path1 in the subset of paths of demand d1 to arrive at the root vertex corresponding to demand d1 at the first hierarchical level. The second path d1_path2 in the subset of paths of demand d1 is then selected for evaluation. The second path d1_path2 in the subset of paths of demand d1 is evaluated and determined to be feasible, so the search tree is traversed along the edge corresponding to the second path d1_path2 in the subset of paths of demand d1 to arrive at the second vertex corresponding to demand d3 at the second hierarchical level. The first path d3_path1 in the subset of paths of demand d3 is evaluated and determined to be feasible, so the search tree is traversed along the edge corresponding to the first path d3_path1 in the subset of paths of demand d3 to arrive at the first vertex corresponding to demand d2 at the third hierarchical level. The first path d2_path1 in the subset of paths of demand d2 is evaluated and determined to be feasible. As a result, based on a determination that paths d1_path2 for demand d1, d3_path1 for demand d3, and d2_path1 for demand d2 are mutually compatible, this set of mutually compatible paths is identified as a solution for the set of demands. It will be appreciated that the traversal of the search tree may end at this point or may continue (e.g., to try to identify a better solution for the set of demands).

It will be appreciated that the search tree 500 of FIG. 5 and the traversal of the search tree 500 of FIG. 5 are merely one example of the manner in which search trees may be constructed and traversed. It will be appreciated that construction and traversal of search tree 500 of FIG. 5 may be performed in various other ways using various other functions (e.g., pruning, truncation, or the like, as well as various combinations thereof) which may be used to improve or optimize construction and traversal of a search tree in order to determine a set of mutually compatible paths for a set of demands. The use of such other functions is depicted and described with respect to FIGS. 1-4.

As discussed herein, the path search mechanism for determining mutually compatible paths for a set of demands may be adapted in various ways using various modifications, enhancements, or the like. The various embodiments of the path search mechanism may be further understood by considering exemplary pseudocode for processes configured to determine mutually compatible paths for a set of demands. FIG. 6 depicts exemplary pseudocode for a method for determining a set of mutually compatible paths for a set of demands where the demands are demand-order independent. As depicted in FIG. 6, pseudocode 600 is configured to determine a set of mutually compatible paths for a set of demands where the demands are demand-order independent (e.g., such as when all paths for all demands are pre-computed on the same network graph). As indicated in pseudocode 600, given that the demands are demand-order independent, pseudocode 600 sets the network graph such that demand reordering is not used in identifying the set of mutually compatible paths for the set of demands. FIG. 7 depicts exemplary pseudocode for a method for determining a set of mutually compatible paths for a set of demands where the demands are demand-order dependent. As depicted in FIG. 7, pseudocode 700 is configured to determine a set of mutually compatible paths for a set of demands where the demands are demand-order dependent. As indicated in pseudocode 700, given that the demands are demand-order dependent, pseudocode 700 modifies the network graph such that demand reordering is used in identifying the set of mutually compatible paths for the set of demands. It will be appreciated that pseudocode 600 of FIG. 6 and pseudocode 700 of FIG. 7 may be adapted to support various modifications, enhancements, and so forth as discussed herein.

Figure 8:
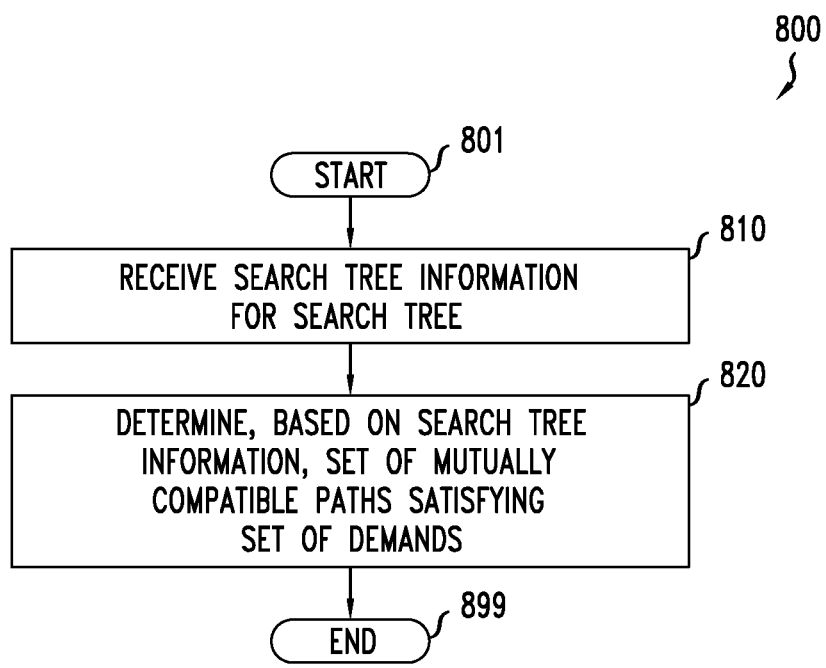
FIG. 8 depicts a flow diagram of a method for determining a set of mutually compatible paths satisfying a set of demands.

FIG. 8 depicts a flow diagram of a method for determining a set of mutually compatible paths satisfying a set of demands. It will be appreciated that, although primarily depicted and described herein as being performed serially, at least a portion of the functions of method 800 may be performed contemporaneously or in a different order than as presented in FIG. 8.

At block 801, method 800 begins.

At block 810, search tree information for a search tree is received.

The search tree information may include search tree construction information (which also may be referred to as search tree input information) configured for use in constructing the search tree (e.g., where the search tree may be constructed on-the-fly, which may only require construction of a portion of the overall search tree before a solution is identified), search tree description information (which also may be referred to as search tree output information) that describes the search tree (e.g., where the search tree has already been constructed), or the like, as well as various combinations thereof. The search tree information is associated with a set of demands to be satisfied within a network. The search tree information includes demand information associated with the demands in the set of demands. The search tree information includes, for each demand in the set of demands, a set of candidate paths available for selection as the path to be used to satisfy the respective demand (subject to mutually compatibility with paths selected for the other demands in the set of demands). The set of candidate paths, for a given demand, may include all or a subset of potential paths between the terminal nodes of the demand. The set of candidate paths, for at least one of the demands, may include an intelligently identified or selected subset of paths identified or selected from the set of potential paths between the terminal nodes of the demand. The intelligently identified or selected subset of paths identified or selected from the set of potential paths between the terminal nodes of the demand, for at least one of the demands, may include a set of mutually disjoint paths between the terminal nodes of the demand. The set of mutually disjoint paths between the terminal nodes of the demand may include all of the mutually disjoint paths between nodes of the demand or may include a subset of all of the mutually disjoint paths between the terminal nodes of the demand. The subset of mutually disjoint paths between the terminal nodes of the demand may be the first X mutually disjoint paths identified for the demand (e.g., X≥2, but less than the total number of all of the mutually disjoint paths for the demand), mutually disjoint paths for the demand that are selected based on selection criteria (e.g., least-cost, shortest, or the like, as well as various combinations thereof), or the like, as well as various combinations thereof. The search tree, when constructed, includes a set of vertices representing the demands and a set of edges representing candidate paths for the demands.

At block 820, a set of mutually compatible paths satisfying the set of demands is determined based on the search tree information. The set of mutually compatible paths satisfying the set of demands may be determined based on the search tree information by traversing all or part of the search tree (e.g., where the search tree information describes the search tree), constructing all or part of the search tree and traversing all or part of the constructed search tree, constructing and traversing all or part of the search tree in combination, or the like, as well as various combinations thereof.

At block 899, method 800 ends.

As discussed herein, the path search mechanism for determining mutually compatible paths for a set of demands may be adapted in various ways using various modifications, enhancements, or the like. While many such modifications and enhancements have been discussed hereinabove, it will be appreciated that various other modifications and enhancements may be supported. Various embodiments may be configured to quickly find an end-to-end path between each pair of a given set of distinct terminal node pairs where the resulting set of paths are mutually edge disjoint. Various embodiments may be configured to determine mutually diverse routes to or from the same node to other nodes or finding two diverse routes for each demand for two or more demands. Various embodiments may be configured to search for an optimal set of paths, such as a mutually disjoint path set that also minimizes a total cost metric where cost can be generally defined (e.g., distance, latency, popularity, inverse residual bandwidth, or the like). Various embodiments may be configured to search for an optimal set of paths for other cases of interest (e.g., node-disjointness, finding more than two mutually diverse routes for each demand in a set of demands, or the like). Various embodiments may be configured to search network topologies for compatible features such as mutually diverse paths. Various embodiments may be configured to provide a meta-heuristic where the meta-heuristic is in the form of an adaptive depth-first search on a tree composed of all paths between the given terminal nodes in the network graph and seeks to find a path subset, composed of one or more paths for each terminal pair, satisfying selected criteria (e.g., mutually edge-disjoint paths with least total cost, node-disjoint paths, multiple disjoint paths between each terminal node pair in a given set, node- or edge-disjoint paths with least cost variation, or the like, as well as various combinations thereof). Various embodiments of such a meta-heuristic may include selecting an initial demand, generating a subset of all paths between the terminal nodes of the initial demand (where the path subset that is generated may depend on problem criteria, such as mutual edge disjointness and total cost minimization), selecting each path in the subset in turn and using a recursive process to test for feasibility (e.g., selecting an unselected demand, generating a path subset for the selected demand, selecting a path from the selected demand, testing the selected path for feasibility (e.g., mutual disjointness) with all currently selected paths, allowing recursion to continue if all paths, selecting and evaluating an alternative path if not all paths are feasible, returning to the previous demand and trying a new path from the subset of previous demand if not paths remain in the path subset of the current demand, and so forth), continuing the search and testing until either a feasible combination of paths is found (in which case the mutually compatible path set and its cost metric may be saved as a candidate solution and the search may continue as long as an input limit on the maximum number of solutions has not been reached) or all paths are tested and no feasible combination is found (in which case the next step may depend on whether or not the path subsets of the demands are generated in a demand-order independent manner (e.g., if the original network graph is used for each demand path subset generation, then the search outcome is independent of demand consideration order, because path edge-disjointness (intersection) is algebraically a commutative operation, and the search is terminated with no solution found) or in a demand-order dependent fashion manner (in which case a new search is repeated with the search tree rooted at a demand distinct from those of prior search trees as long as such demands remain)), and where, at any stage of the search, if any new feasible path combination does not have a running cost metric that meets or outperforms that of the best candidate solution, that new path combination can be discarded and the search can continue (which may also include testing cost metrics during the search against the known best solution cost metric in order to reduce the computational effort). Various embodiments may be configured to control overall computation effort using one or more of limiting the maximum number of solutions found, immediate pruning of infeasible search branches, cost bounding, and restricting the size, quality, and manner of the paths generated for each demand. Various embodiments may be configured to aggressively search for mutually edge-disjoint paths having least total cost. Various embodiments may be configured to generate demand path subsets based on a residual graph of unused edges to provide a demand-order dependent search where it is noted that: (1) while this may result in added computational effort in the search for good solutions, the computational effort can be limited based on a key insight into the quality of path subset generation for an individual demand (the insight being to create a set of least-cost paths that are themselves mutually disjoint, where the rationale is that if paths of two or more demands are non-disjoint, then alternative paths for each demand that are disjoint among themselves can avoid the conflicts of the original set of paths) and (2) choosing least-cost mutually disjoint paths for each demand is also compatible with the overall cost metric and increases the propensity for finding a mutually disjoint path set for all demands that has least total cost. Various embodiments, given that many problem instances tend to fall into two main categories including a first category tending to have several feasible solutions and a second category tending to have infeasible solutions and shallow searches of the search tree, may be configured to improve path searches (in addition to using the aforementioned quality of path subset generation for boosting computation efficiency) by controlling the first category by limiting the number of candidate solutions and controlling the second category by limiting the demand path subset cardinality below its upper bound (max |{mutually disjoint paths in G for demand $d_n=(s_n, t_n)$}|≤min {$deg(s_n)$, $deg(t_n)$}). Various embodiments may be configured to address various extensions to the basic problem of finding a least-cost mutually edge-disjoint path set for a given set of distinct demands (e.g., an extension in which some of the terminal nodes coincide (such as same-source/multiple-terminations (or vice-versa) or demand chains), an extension in which the demands include multiple identical demands ($s_i$, $t_i$)=($s_j$, $t_j$) for finding multiple diverse paths between the same node pairs (which may be based on a requirement that the resulting paths will be diverse not only for the same terminal node pairs but also from paths of all other terminal node pairs or may not require diversity with paths between other nodes (since, typically, a requirement that the resulting paths will be diverse not only for the same terminal node pairs but also from paths of all other terminal node pairs may result in infeasibility due to the stringent diversity requirements)), an extension in which the network links are asymmetric (different costs for oppositely directed traffic on the links) since it internally employs a directional weight matrix representation of the network graph, an extension in which the problem is to find node-disjoint paths rather than edge-disjoint paths, an extension in which there are bandwidth variations among the demands, an extension directed to an alternative optimization objective (e.g., minimizing the maximum cost path, minimizing the path cost variation, or the like). Various embodiments may be configured to provide improved computational efficiency (e.g., path ordering (e.g. least-cost or least-conflicted first), demand ordering restriction, infeasible demand set pattern recognition, whether the computational tradeoff favors including pruning with total cost bounding, or the like, as well as various combinations thereof. Various embodiments may be configured to provide algorithmic responsiveness tradeoffs in terms of speed versus quality that would be necessary or desirable in an online, on-demand network programming paradigm (e.g., algorithms that find good solutions quickly but perhaps not always "perfectly" or optimally). Various other extensions, modifications, enhancements, and so forth are contemplated.

It will be appreciated that, although primarily presented herein with respect to use of the mutually compatible path search mechanism within the context of determining mutually compatible paths for a set of demands, various embodiments of the mutually compatible path search mechanism may be used or adapted to determine feasibility of mutually compatible paths for a set of demands.

It will be appreciated that, although primarily presented herein with respect to use of the mutually compatible path search mechanism within the context of communication networks for determining communication paths, the mutually compatible path search mechanism also may be used within various other contexts for determining mutually compatible paths. For example, the mutually compatible path search mechanism also may be used for determining travel paths within a road network, for determining relationships or connections between individuals in a social network, or the like. Accordingly, various terms used herein that are specific to communication networks may be read more generally so as to cover other contexts within which the mutually compatible path search mechanism may be applied.

Figure 9:
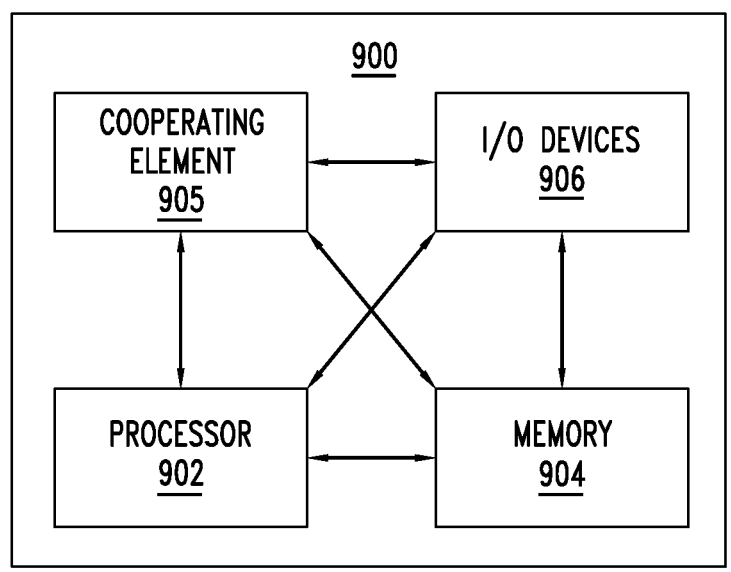
FIG. 9 depicts a high-level block diagram of a computer suitable for use in performing various functions described herein.

FIG. 9 depicts a high-level block diagram of a computer suitable for use in performing various functions described herein.

The computer 900 includes a processor 902 (e.g., a central processing unit (CPU), a processor having a set of processor cores, a processor core of a processor, or the like) and a memory 904 (e.g., a random access memory (RAM), a read only memory (ROM), or the like). The processor 902 and the memory 904 are communicatively connected.

The computer 900 also may include a cooperating element 905. The cooperating element 905 may be a hardware device. The cooperating element 905 may be a process that can be loaded into the memory 904 and executed by the processor 902 to implement functions as discussed herein (in which case, for example, the cooperating element 905 (including associated data structures) can be stored on a computer-readable storage medium, such as a storage device or other storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 of FIG. 9 may represent a general architecture and functionality suitable for implementing functional elements described herein, portions of functional elements described herein, or the like, as well as various combinations thereof. For example, computer 900 may provide a general architecture and functionality that is suitable for implementing a node 112, the path determination element 120, a node 212, or any other device or element depicted herein.

It will be appreciated that the functions presented herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents). It is noted that the computing resources used to provide functions presented herein may be centralized or distributed (e.g., logically centralized but physically distributed).

It will be appreciated that at least some of the steps discussed herein as software methods may be implemented within hardware, for example, as circuitry that performs various method steps, as circuitry that cooperates with the processor to perform various method steps, or the like, as well as various combinations thereof. Portions of the functions/elements described herein may be implemented as a computer program product storing computer instructions which, when processed by a computer, adapt the operation of the computer such that methods steps and/or techniques described herein are invoked or otherwise provided. Instructions for invoking various methods may be stored in fixed or removable media (e.g., non-transitory computer-readable media), transmitted via a data stream in a broadcast or other signal bearing medium, stored within a memory of a computing device operating according to the instructions, or the like, as well as various combinations thereof.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus at least to:
   receive network information for a network including a set of nodes and a set of links;
   receive demand information associated with a set of demands to be satisfied within the network, wherein the demands are indicative of requests for paths between respective pairs of the nodes of the network;
   determine, for each of the demands based on the network information and the demand information, a respective set of paths between the respective pair of nodes of the respective demand, wherein, for at least one of the demands, the respective set of paths for the respective demand comprises a respective subset of paths for the respective demand that is identified from among a set of potential paths for the respective demand and that includes two or more mutually disjoint paths between the respective pair of nodes of the respective demand; and
   determine, based on a traversal of a search tree comprising a set of edges representing at least a portion of the paths for the demands, a set of mutually compatible paths satisfying the set of demands, wherein a mutual compatibility of the mutually compatible paths is based on a mutual disjointness of the mutually compatible paths.

2. The apparatus of claim 1, wherein the mutual disjointness of the mutually compatible paths is based on at least one of link-disjointness or node-disjointness.

3. The apparatus of claim 1, wherein the demand information comprises, for at least one of the demands, one or more constraints associated with the respective demand.

4. The apparatus of claim 3, wherein the one or more constraints associated with the respective demand comprises at least one of a path-level constraint for the demand, a node-level constraint for the demand, or a link-level constraint for the demand.

5. The apparatus of claim 1, wherein the search tree comprises a set of vertices representing the demands.

6. The apparatus of claim 1, wherein the two or more mutually disjoint paths between the respective pair of nodes of the respective demand are at least one of node-disjoint or link-disjoint.

7. The apparatus of claim 1, wherein the at least one memory and the computer program code are configured to, with the at least one processor, cause the apparatus at least to:
   determine the respective subset of paths for the respective demand based on a Suurballe-Tarjan algorithm or a Bhandari algorithm.

8. The apparatus of claim 1, wherein the at least one memory and the computer program code are configured to, with the at least one processor, cause the apparatus at least to:
   determine the respective subset of paths for the respective demand prior to beginning the traversal of the search tree.

9. The apparatus of claim 1, wherein the at least one memory and the computer program code are configured to, with the at least one processor, cause the apparatus at least to:
   determine the respective subset of paths for the respective demand during the traversal of the search tree.

10. The apparatus of claim 9, wherein, to determine the respective subset of paths for the respective demand during the traversal of the search tree, the at least one memory and the computer program code are configured to, with the at least one processor, cause the apparatus at least to:
    determine a current set of mutually compatible paths identified during the traversal of the search tree;
    remove, from consideration for use in determining the set of potential paths between the respective pair of nodes of the respective demand, any links associated with the current set of mutually compatible paths to provide a set of links remaining for consideration;
    determine the set of potential paths between the respective pair of nodes of the respective demand based on the set of links remaining for consideration; and
    select the subset of paths for the respective demand from the set of potential paths between the respective pair of nodes of the respective demand.

11. The apparatus of claim 1, wherein the at least one memory and the computer program code are configured to, with the at least one processor, cause the apparatus at least to:
    determine a priority order of the respective subset of paths for the respective demand; and
    evaluate the respective subset of paths for the respective demand, during the traversal of the search tree, based on the priority order of the respective subset of paths for the respective demand.

12. The apparatus of claim 1, wherein the at least one memory and the computer program code are configured to, with the at least one processor, cause the apparatus at least to:
    prune a branch of the search tree, during the traversal of the search tree, based on a determination that a cost of a candidate set of mutually compatible paths associated with the branch of the search tree exceeds a cost of a previously-identified set of mutually compatible paths satisfying the set of demands.

13. The apparatus of claim 1, wherein the at least one memory and the computer program code are configured to, with the at least one processor, cause the apparatus at least to:
    truncate the traversal of the search tree based on the determination of the set of mutually compatible paths satisfying the set of demands.

14. The apparatus of claim 1, wherein the at least one memory and the computer program code are configured to, with the at least one processor, cause the apparatus at least to:
    continue the traversal of the search tree based on the determination of the set of mutually compatible paths.

15. The apparatus of claim 14, wherein the at least one memory and the computer program code are configured to, with the at least one processor, cause the apparatus at least to:
    determine, based on the continuing traversal of the search tree, a second set of mutually compatible paths satisfying the set of demands; and
    select, as a solution for the set of demands, the set of mutually compatible paths or the second set of mutually compatible paths.

16. The apparatus of claim 1, wherein the traversal of the search tree is demand-order independent.

17. The apparatus of claim 1, wherein the traversal of the search tree is demand-order dependent, wherein the search tree is organized based on a first ordering of the demands, wherein the at least one memory and the computer program code are configured to, with the at least one processor, cause the apparatus at least to:
determine, based on a traversal of a second search tree organized based on a second ordering of the demands, a second set of mutually compatible paths satisfying the set of demands; and
select, as a solution for the set of demands, the set of mutually compatible paths or the second set of mutually compatible paths.

18. The apparatus of claim 1, wherein the traversal of the search tree is based on solution-level demand information included in the demand information.

19. The apparatus of claim 18, wherein the solution-level demand information comprises a solution-level objective for the set of mutually compatible paths.

20. The apparatus of claim 19, wherein the solution-level objective comprises at least one of minimizing a total cost of the set of mutually compatible paths, minimizing a maximum path cost of the set of mutually compatible paths, or minimizing a difference between a lowest-cost path of the set of mutually compatible paths and a highest-cost path of the set of mutually compatible paths.

21. The apparatus of claim 18, wherein the solution-level demand information comprises a solution-level constraint to be satisfied for the set of mutually compatible paths.

22. The apparatus of claim 21, wherein the solution-level constraint comprises at least one of a maximum total cost of the set of mutually compatible paths or a maximum path cost for the set of mutually compatible paths.

23. A non-transitory computer-readable storage medium comprising program instructions for causing an apparatus to perform at least:
receiving network information for a network including a set of nodes and a set of links;
receiving demand information associated with a set of demands to be satisfied within the network, wherein the demands are indicative of requests for paths between respective pairs of the nodes of the network;
determining, for each of the demands based on the network information and the demand information, a respective set of paths between the respective pair of nodes of the respective demand, wherein, for at least one of the demands, the respective set of paths for the respective demand comprises a respective subset of paths for the respective demand that is identified from among a set of potential paths for the respective demand and that includes two or more mutually disjoint paths between the respective pair of nodes of the respective demand; and
determining, based on a traversal of a search tree comprising a set of edges representing at least a portion of the paths for the demands, a set of mutually compatible paths satisfying the set of demands, wherein a mutual compatibility of the mutually compatible paths is based on a mutual disjointness of the mutually compatible paths.

24. A method, comprising:
receiving, by a processor, network information for a network including a set of nodes and a set of links;
receiving, by the processor, demand information associated with a set of demands to be satisfied within the network, wherein the demands are indicative of requests for paths between respective pairs of the nodes of the network;
determining, by the processor for each of the demands based on the network information and the demand information, a respective set of paths between the respective pair of nodes of the respective demand, wherein, for at least one of the demands, the respective set of paths for the respective demand comprises a respective subset of paths for the respective demand that is identified from among a set of potential paths for the respective demand and that includes two or more mutually disjoint paths between the respective pair of nodes of the respective demand; and
determining, by the processor based on a traversal of a search tree comprising a set of edges representing at least a portion of the paths for the demands, a set of mutually compatible paths satisfying the set of demands, wherein a mutual compatibility of the mutually compatible paths is based on a mutual disjointness of the mutually compatible paths.

* * * * *